(12) United States Patent
Rourk

(10) Patent No.: US 8,738,405 B2
(45) Date of Patent: May 27, 2014

(54) METHOD FOR REIMBURSEMENT FROM PRE-TAX SPENDING ACCOUNTS

(75) Inventor: Christopher J. Rourk, Dallas, TX (US)

(73) Assignee: 3233 Via Dunham LLC, Wilmington, DE (US)

( * ) Notice: Subject to any disclaimer, the term of this patent is extended or adjusted under 35 U.S.C. 154(b) by 212 days.

(21) Appl. No.: 13/287,070

(22) Filed: Nov. 1, 2011

(65) Prior Publication Data

US 2012/0046976 A1 Feb. 23, 2012

Related U.S. Application Data

(62) Division of application No. 10/621,940, filed on Jul. 17, 2003, now Pat. No. 8,051,006.

(60) Provisional application No. 60/405,632, filed on Aug. 23, 2002, provisional application No. 60/401,409, filed on Aug. 7, 2002.

(51) Int. Cl.
*G06Q 40/00* (2012.01)

(52) U.S. Cl.
USPC .............................................. 705/4; 705/35

(58) Field of Classification Search
USPC ......................... 705/4, 35, 36 R, 37
See application file for complete search history.

(56) References Cited

U.S. PATENT DOCUMENTS

| | | |
|---|---|---|
| 7,117,172 B1 | 10/2006 | Black |
| 7,319,986 B2 | 1/2008 | Praisner et al. |
| 7,536,349 B1 * | 5/2009 | Mik et al. .................. 705/39 |
| 8,051,006 B1 | 11/2011 | Rourk |
| 2002/0147678 A1 * | 10/2002 | Drunsic ..................... 705/39 |
| 2002/0174030 A1 | 11/2002 | Praisner et al. |

* cited by examiner

*Primary Examiner* — Lalita M Hamilton
(74) *Attorney, Agent, or Firm* — Baker & Hostetler LLP

(57) ABSTRACT

A payment system for spending accounts is provided. The payment system includes a qualified vendor system, such as a point of sale system at a doctor's office, that generates purchase data and point of sale data, such as a co-pay amount, a credit card number, and a point of sale device identifier. An account management system receives the purchase data and point of sale data and generates authorized purchase data, such as by determining whether payment of co-pay can be automatically authorized based on pre-qualification of the doctor's office as an authorized source.

47 Claims, 4 Drawing Sheets

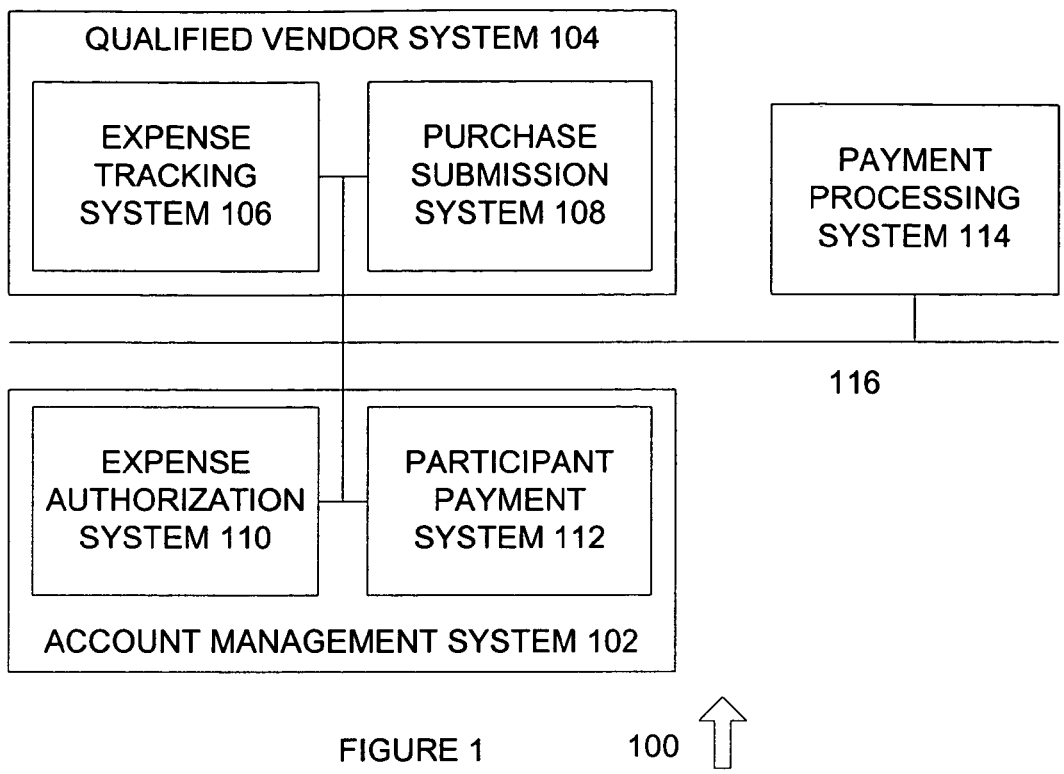

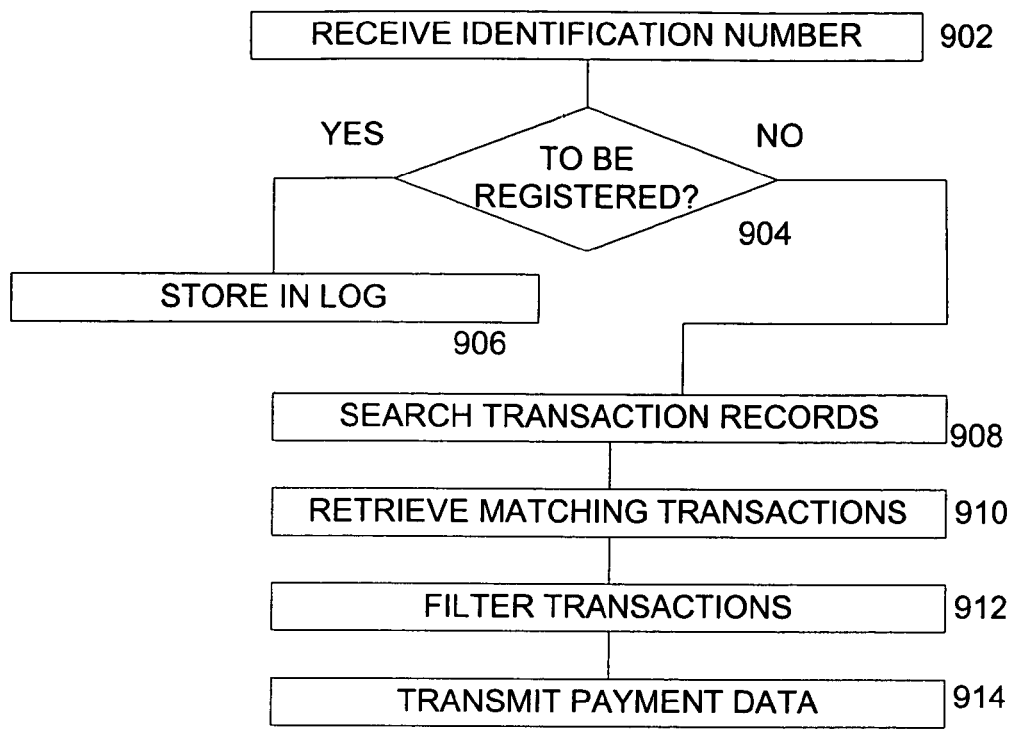
FIGURE 9

US 8,738,405 B2

METHOD FOR REIMBURSEMENT FROM PRE-TAX SPENDING ACCOUNTS

RELATED APPLICATIONS

This application is a divisional of U.S. application Ser. No. 10/621,940, filed Jul. 17, 2003, now U.S. Pat. No. 8,051,006, issued Nov. 1, 2011, which claims priority to U.S. provisional applications 60/405,632, filed Aug. 23, 2002, and 60/401,409, filed Aug. 7, 2002, each of which is hereby incorporated by reference for all purposes.

FIELD OF THE INVENTION

The present invention pertains to the field of payment systems for spending accounts. More specifically, the invention relates to payment systems for spending accounts that require pre-authorization for reimbursement.

BACKGROUND OF THE INVENTION

Systems for tracking program participation are known in the art. Such systems include systems that track credits for associated purchases, such as for programs that reward frequent flyer points for dining, and rebates for use of a credit card.

While such programs are useful, they generally require very little in the way of second-level functionality. For example, the frequent flyer program may reward points for each dollar spent at a dining establishment, but after the points are generated and credited to the account, no additional functionality os required. Likewise, the rebate systems credit an amount for use of a card, and once a year or otherwise, the user can elect to receive an award based on the points accumulated. Thus, after the credit is made, no further actions are performed. In addition, the consumer is under no obligation to verify the correctness of the credit, such that if an improper award of credits is made to the consumer, they benefit and the organization granting the credits suffers a loss.

SUMMARY OF THE INVENTION

In accordance with the present invention, a payment system for spending accounts is provided that overcomes known problems with existing payment systems for spending accounts.

In particular, a payment system for spending accounts is provided that performs pre-authorization of expenses before providing reimbursement.

In accordance with an exemplary embodiment of the present invention, a payment system for spending accounts is provided. The payment system includes a qualified vendor system, such as a point of sale system at a doctor's office, that generates purchase data and point of sale data, such as a co-pay amount, a credit card number, and a point of sale device identifier. An account management system receives the purchase data and point of sale data and generates authorized purchase data, such as by determining whether payment of co-pay can be automatically authorized based on pre-qualification of the doctor's office as an authorized source.

The present invention provides many important technical advantages. One important technical advantage of the present invention is a payment system for spending accounts that determines whether a source or item is authorized for reimbursement without user input, thus allowing reimbursement to be automatically provided to a program participant.

Those skilled in the art will appreciate the advantages and superior features of the invention together with other important aspects thereof on reading the detailed description that follows in conjunction with the drawings.

BRIEF DESCRIPTION OF THE SEVERAL VIEWS OF THE DRAWINGS

FIG. 1 is a diagram of a system for refunding expenses in accordance with an exemplary embodiment of the present invention;

FIG. 2 is a diagram of a system for tracking expenses in accordance with an exemplary embodiment of the present invention;

FIG. 3 is a diagram of a system for submitting payment data in accordance with an exemplary embodiment of the present invention;

FIG. 9 is a flow chart of a method for registering a credit card number or social security number and using the registered number to process expense reimbursement in accordance with an exemplary embodiment of the present invention.

DETAILED DESCRIPTION OF THE INVENTION

Figure 4:
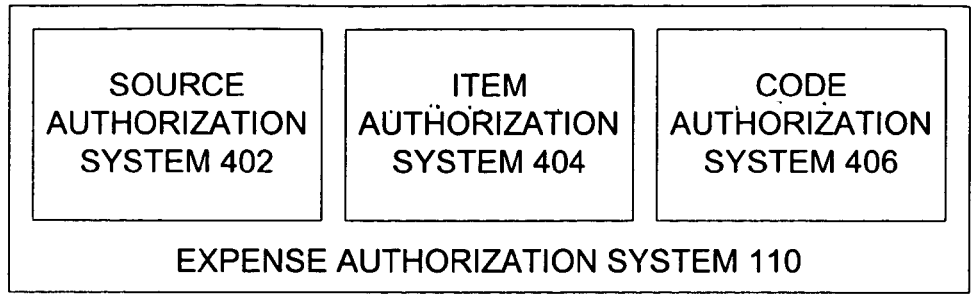
FIG. 4 is a diagram of a system for providing expense authorization in accordance with an exemplary embodiment of the present invention.

In the description that follows like parts are marked throughout the specification and drawings with the same reference numerals, respectively. The drawing figures are not necessarily to scale and certain features may be shown in somewhat generalized or schematic form in the interest of clarity and conciseness.

FIG. 1 is a diagram of a system 100 for refunding expenses in accordance with an exemplary embodiment of the present invention. System 100 allows qualified expenses such as medical spending account expenses, business expenses, or other suitable expenses to be processed without submission of payment request forms, manual expense item review, or other user input.

System 100 includes account management system 102, qualified vendor system 104, expense tracking system 106, purchase submission system 108, expense authorization system 110, participant payment system 112, and payment processing system 114, each of which can be implemented in hardware, software, or a suitable combination of hardware and software, and which be one or more hardware systems, or one or more software systems operating on general purpose processing platforms. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

Qualified vendor system 104 is coupled to payment processing system 114 and account management system 102 by communications medium 116. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system. Communications medium 116 can be a local area network, a wide area network, a public network such as the Internet, the public switched telephone network, a wireless network, a fiber optic network, other suitable media, or a suitable combination of such media.

Qualified vendor system 104 receives goods and service identification data and payment data and provides the goods and service identification data and payment data to payment processing systems 114, account management system 102 or other suitable systems. In one exemplary embodiment, qualified vendor system 104 can include code data that identifies that qualified vendor system 104 has been previously qualified to participate in the program.

Expense tracking system 106 allows expenses for goods and services to be tracked according to user identification data, event data, or the suitable data. In one exemplary embodiment, expense tracking system 106 keeps records of purchases of goods and services made by a transaction number, where the transaction number is associated with payment data. In this exemplary embodiment, qualified vendor system 104 can submit a payment to payment processing system 114 where payment processing system notifies account management system 102 that a payment has been submitted and provides account management system 102 with an identification number. Account management system 102 can then provide the identification number to qualified vender system 104 and receive the expense tracking data from expense tracking system 106.

Purchase submission system 108 provides payment data to payment processing system 114. In one exemplary embodiment, purchase submission system 108 can include a credit card point of sale system that provides credit card data and other payment data to payment processing system 114, such as data that identifies that the payment data is being submitted from a qualified vendor, that the payment data is being submitted for a participant in the program, or the suitable data. In another exemplary embodiment, purchase submission system 108 can be a pharmacy submitting pharmaceutical charge data to an insurance company charge authorization system through a pharmacy payment switch that is used to route pharmaceutical data and insurance data to an insurance company for determination of a copay or deductible amount, authorization of a total charge amount, or other suitable processing. In this exemplary embodiment, the copay amount, deductible amount, or other out-of-pocket payment can be determined for a registered user using a social security number or other form of identification data, such that registration data for a credit card is not required to obtain the data.

Account management system 102 performs account management functions for participants in a payment processing program for expense account payments, medical spending account payments, or other suitable programs. Account management system 102 generates payment data for participants in programs, such as medical spending programs or business expense programs, such that the participant is compensated for qualified expenses without the need for submitting a form and associating and corroborating documents.

Expense authorization system 110 receives payment data and verifies the payment data. In one exemplary embodiment, expense authorization system 110 can verify the payment data based on source data, based on identification data for goods and services, or other suitable data.

Participant payment system 112 receives authorized expense data from expense authorization system 110 or other suitable systems and generates payment data. In one exemplary embodiment, the payment data can be control data for printing a check, credit data that is submitted to payment processing system 114 or other suitable systems to provide payment to a user through electronic funds transfer, or other suitable systems.

In operation, system 100 allows users to be reimbursed for qualified business expenses, qualified medical spending account expenses or other suitable expenses without requiring the user to submit a report or other request for payment, such as one that includes corroborating documents. In one exemplary embodiment, system 100 can be used in a medical spending account plan, where pre-tax dollars can be used to pay for qualified medical expenses. In this exemplary embodiment, system 100 can verify that the expenses incurred are qualified based on the source where the expenses were incurred, by receiving information identifying the goods and services purchased, or in other suitable manners. For example, locations such as hospitals, emergency rooms, and doctor offices may be qualified as sources based on an analysis of the goods and services sold by such sources and verification that no non-qualified goods or services are provided. Likewise, other sources such as drug stores and grocery stores can provide additional itemization data, such as by providing the itemization data in response to a request from account management system 102. In this exemplary embodiment, transmission of itemized expense data to payment processing system 114 might not be feasible, such that account management system 102 only receives notification of the occurrence of a potentially qualifying event, and must then subsequently directly contact qualified system 104 to receive additional details and determine if the goods and services are qualified expenses.

In this second exemplary embodiment, expense tracking system 106 can store purchase data for goods and services, either for all goods and services associated with the purchase transaction, for goods and services that have been verified to match authorized goods and services, or in other suitable manners. Qualified vendor system 104 then receives payment data, such as a credit card number or other suitable data from the user, and transmits the payment data to payment processing system 114. The payment data can include flag data that identifies the transaction as having potentially reimbursable medical expenses, business expenses, or other suitable expenses. Likewise, a user can register a form of payment, such as a credit card, with the program, such as a medical expense reimbursement program or a business expense reimbursement program, and payment processing system 114 can determine based on the registration number whether the expense should be further scrutinized, such as by its transmission to account management system 102, by transmission of purchase record identification data to account management system 102, or in other suitable manners. Account management system can also obtain data identifying the goods and services from other suitable sources, such as from a credit card data processing system that stores purchase data, from an insurance data processing system that stores co-pay data, or from other suitable sources.

Account management system 102 receives the purchase identification data, such as by receiving data from qualified vendor system 104, payment processing system 114, or in other suitable manners. In one exemplary embodiment, qualified vendor system 104 can transmit payment data to payment processing system 114, and can transmit a subset of that data to account management system 102. Account management system 102 then determines whether an expense is authorized. For example, account management system 102 can compare the source data to a list of qualified sources, can receive itemization data that identifies specific goods and services purchased and can compare the goods and services to a list of qualified goods and services, or other suitable processes can be used. After expenses have been authorized, account management system 102 generates payment data, such as by printing a check and mailing it to the participant, by crediting the participant's credit card account, or in other suitable manners. Reports can also be generated, such as reports to government agencies, reports to users, or other suitable reports.

FIG. 2 is a diagram of a system 200 for tracking expenses in accordance with an exemplary embodiment of the present invention. System 200 includes expense tracking system 106, expense itemization system 202, authorized expense system 204, and item reporting system 206, each of which can be implemented in hardware, software, or a suitable combination of hardware and software, and which can be one or more software systems operating on a general purpose processing platform.

Expense itemization system 202 stores goods and services data that can be used to itemize expenses for use in a business expense reimbursement program, a medical expense reimbursement program, or other suitable processes. Expense itemization system 202 can store data identifying the goods and services purchased, whether the goods and services have been authorized, whether the goods and services could have been purchased for unauthorized purposes or other suitable data. In one exemplary embodiment, expense itemization system 202 can be hosted in a system other than one at the point of sale, such as at a credit card data processing system where itemized credit card data is processed, or at an insurance data processing system, where insurance data is processed.

Authorized expense system 204 stores authorized expense data that identifies goods and services that have been approved for reimbursement. In one exemplary embodiment, authorized expense system 204 can be accessed by expenses itemization system 202, and a set of goods and services that have been purchased by a user that have been authorized for reimbursement can be identified. In this exemplary embodiment, audit data can be stored that identifies the goods and services purchased, and sum data for the authorized purchases can be transmitted with a code that identifies that the amount transmitted has been authorized. In this exemplary embodiment, all record keeping is performed locally or in a centralized location, such as where qualified vendor 104 periodically generates reports that are stored by account management system 102 or in other suitable locations.

Item reporting system 206 responds to query data from account management system 102 and provides item identification data. In one exemplary embodiment, the item identification data can include identification for goods and services purchased, such as those stored on expense itemization system 202. Item reporting system 206 thus receives query data from account management system 102 and provides the item identification data.

In operation, system 200 allows expenses to be tracked for use in a program, such as a business expense reimbursement program, a medical reimbursement program, or other suitable programs. System 200 can provide item verification, item auditing, or other suitable functions.

FIG. 3 is a diagram of a system 300 for submitting payment data in accordance with an exemplary embodiment of the present invention. System 300 includes purchase submission system 108, account management interface system 302, and expense flagging system 304, each of which can be implemented in software, hardware, or a suitable combination of hardware and software, and which can be one or more software systems operating on a general purpose processing platform.

Account management interface system 302 interfaces with account management system 102 when a purchase is made, such as by transmitting the purchase data or a subset of the purchase data that is submitted to payment processing system 114, to account management system 102, or to other suitable systems. Account management interface system 302 can also be used by expense tracking system 106 or other suitable systems to interface with account management system 102.

Expense flagging system 304 provides one or more codes to payment processing system 114, account management system 102, or other suitable systems. In one exemplary embodiment expense flagging system 304 can provide a code that is used by payment processing system 114 to identify qualified vendors, to identify transactions that include qualified expenses, or other suitable data.

In operation, system 300 allows purchase data to be submitted to a payment processing system 114, account management system 102, or other suitable systems so that the purchase data can be used in a suitable program, such as a business expense reimbursement program, medical spending expense reimbursement program, or other suitable programs.

FIG. 4 is a diagram of a system 400 for providing expense authorization in accordance with an exemplary embodiment of the present invention. System 400 includes expense authorization system 110 and source authorization system 402, item authorization system 404, and code authorization system 406, each of which can be implemented in hardware, software, or a suitable combination of hardware and software, and which can be one or more software systems operating on a general purpose processing platform.

Source authorization system 402 performs source authorization based on source identification data. In one exemplary embodiment, source authorization system 402 receives purchase data that includes source identification data, and authorizes the use of the purchase data to generate reimbursement data based on the source identification. In this exemplary embodiment, source authorization system 402 can receive a point of sale identifier or other suitable data that identifies the source, amount data that identifies the amount spent on goods and services, or other suitable data, and can authorize reimbursement of some or all of the amount based on the source, the amount spent, or other suitable data. In one exemplary embodiment, source authorization system 402 can include co-pay data, such that source authorization system 402 can determine whether an amount paid was a co-pay for services performed that would be reimbursable under a medical expense plan. Likewise, source authorization system 402 can have limits, such as limits for meals or other expenses that will be compensated, such that source authorization system 402 can determine that a meal or other suitable expanse can be compensated up to a certain limit. Other suitable processes can be performed.

Item authorization system 404 receives identification data for goods and services and determines whether the goods and services are authorized. In one exemplary embodiment, item authorization system 404 can receive a list of goods and services purchased at a location such as a drug store or grocery store where such goods and services can include non-qualifying expenses, and can perform verification for the itemized goods and services to determine which ones are authorized. Likewise, item authorization system 404 can provide authorized lists to qualified vendor systems 104 so that the qualified vendor systems 104 can perform item authorization system locally. Item authorization system 404 can also store audit data that is received periodically from qualified vendor systems 104, or other suitable processes can be performed. In another exemplary embodiment, item authorization system 404 determines whether items have been previously authorized for reimbursement, such as where a user can submit a request for reimbursement separate from the data received from qualified vendor system 104 or other suitable systems. For example, a user may need to provide receipts for certain types of data, but may have the option of allowing data to be provided from qualified vendor system 104 or other suitable systems, such that it can be necessary to determine whether an item has previously been authorized. Item authorization system 404 thus allows existing systems for authorizing items that require manual review of data to be used in conjunction with systems that allow expense authorization to be performed without user input.

Code authorization system 406 determines whether expenses for goods and services are authorized based on one or more codes. In this exemplary embodiment, code authorization system 406 can receive data from qualified vendor system 104, payment processing system 114, or other suitable systems and can determine whether expenses are qualified for a program based on codes associated with the data received. For example, payment processing system 114 can receive data that identifies participating credit cards for a program, and participating source codes for the program, and can transmit payment data to account management system 102 and code authorization system 406 based on a match between the credit card number and point of sale source number. In this example, if doctor's offices are qualified based on an absence of non-qualifying goods and services provided by such doctor's office locations, then the point of sale or other associated number for that doctor's office can be used to flag qualified participants, such as based on the use of a registered credit card number, and this data can be provided to code authorization 406 for payment. Likewise, other suitable processes can be used.

In operation, system 400 is used to authorize expenses based on source identification data, amount data, goods and service identification data, or other suitable data. Expense authorization system 110 can also provide qualified expense data to qualified vendor systems 104, can store data based on transactions, and can perform other suitable processes.

Figure 5:
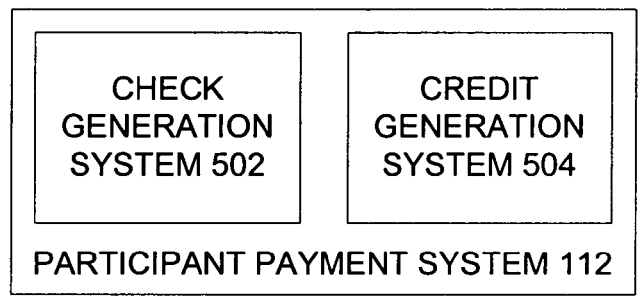
FIG. 5 is a diagram of a system for paying participants in a program in accordance with an exemplary embodiment of the present invention.

FIG. 5 is a diagram of a system 500 for paying participants in a program in accordance with an exemplary embodiment of the present invention. System 500 includes participant payment system 112, check generation system 502 and credit generation system 504, each of which can be implement in hardware, software, or a suitable combination of hardware and software, and which can be one or more software systems on a general purpose processing platform.

Check generation system 502 receives payment data and generates a check for a participant in a program. In one exemplary embodiment, check generation system 502 can also generate log data that is used to track payments made to participants, can debit the amount paid from a credit balance, such as where the participant of a medical spending account program has a fixed amount in a medical spending account that can be reimbursed, can verify that an amount to be reimbursed does not exceed the credit balance, and can perform other suitable processes.

Credit generation system 504 can perform electronic funds transfer data generation, such as where payment is made directly to a participant's bank account, credit card, or other suitable processes.

Figure 6:
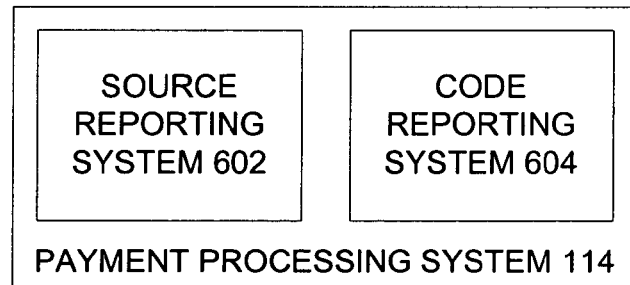
FIG. 6 is a diagram of a system for processing payments in accordance with an exemplary embodiment of the invention.

FIG. 6 is a diagram of a system 600 for processing payments in accordance with an exemplary embodiment of the present invention. System 600 includes source reporting system 602, code reporting system 604 and payment processing system 114, each of which can be implemented in hardware, software, or a suitable combination of hardware and software, and which can be one or more software systems on a general purpose processing platform.

Source reporting system 602 receives purchase data and reports the purchase data to account management system 102 or other suitable systems based on source data. In this exemplary embodiment, source reporting system 602 can receive source data, such as a point of sale terminal identifier or other suitable source data, and can determine from the source data whether the source is a participant in a program. Source reporting system 602 can also receive payment type data, such as credit card data or other suitable data, can then verify whether the payment type data and the source data, such as where using a credit card at a pre-authorized location allows any expenses charged at that location to be reimbursed, and can then provide the purchase data to account management system 102 or other suitable systems if a match has occurred. Other suitable processes can be performed by sources reporting system 602.

Code reporting system 604 can receive one or more codes and generate reporting data based on the code. In this exemplary embodiment, qualified vendor system 104 other suitable systems can be provided with one or more codes that are used to classify goods and services that have been purchased, such as where qualified vendor system 104 determines whether goods and services are qualified and stores data for audit purposes, provides the data to account management system 102, or performs other suitable processes. Payment processing system 114 can receive codes from qualified vendor system 104 that identify that additional processing needs to be performed, and can report to account management system 102 based on these codes. Likewise, code reporting system 104 can be used to flag business expenses, or other suitable expenses for other suitable programs.

Figure 7:
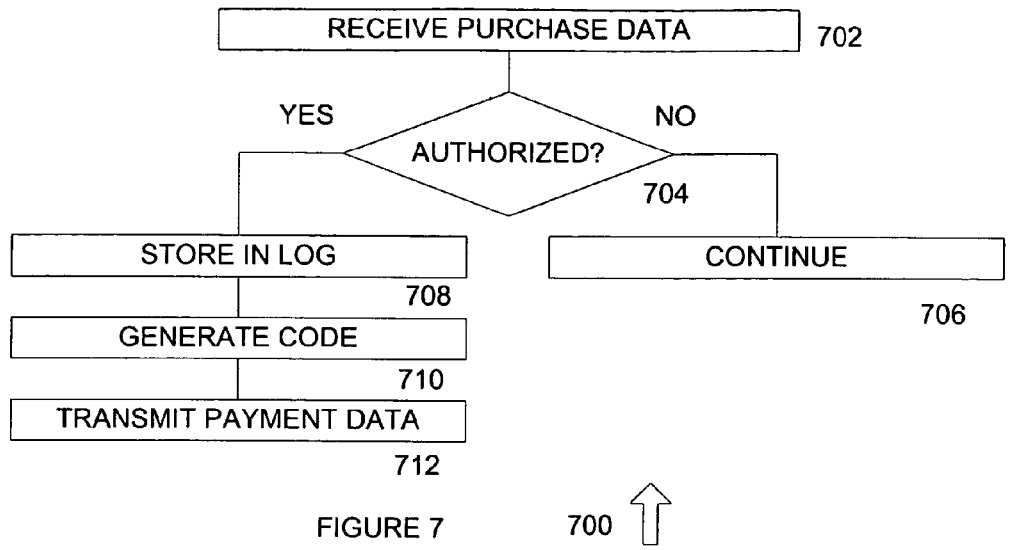
FIG. 7 is a flow chart of a method for processing purchase data for an expense reimbursement program in accordance with an exemplary embodiment of the present invention.

FIG. 7 is a flow chart of a method 700 for processing purchase data for an expense reimbursement program in accordance with an exemplary embodiment of the present invention. Method 700 begins at 702 where purchase data is received. In one exemplary embodiment the purchase data can be received at a point of sale device or system. In another exemplary embodiment, the purchase data can be received at a payment processing system, an account management system, or other suitable systems. The method then proceeds to 704.

At 704 it is determined whether the purchase data is authorized. In one exemplary embodiment, authorization can be determined based on the source of the purchase data, based on identification of specific goods and services that have been authorized, or in other suitable processes or manners. Likewise, whether a good or service has been authorized can be determined at a source such as by qualified vendor system 104, at a payment processing system 114, an account management system 102, or other suitable systems. If it is determined that the purchase data is not authorized the method proceeds to 706 and processing of the purchase data continues. Otherwise, the method proceeds to 708.

At 708, the purchase data can be stored in a log. In one exemplary embodiment, the purchase data can be stored in any log at the qualified vendor system 104, by account management system 102, or in other suitable logs. The method then proceeds to 710.

At 710 a code is generated. In one exemplary embodiment, the code is generated when determination of whether purchase data is authorized is performed by qualified vendor system 104, such as to transmit to payment processing system 114 so as to flag the purchase data as being data that should be transmitted to account management system 102. In another exemplary embodiment, the code can be used to identify the record of a transaction that should be provided to account management system 102 when requested. In this exemplary embodiment, participants in a program can be identified, such as based on credit card number, and the code can be generated if a participant in a program makes a purchase, where the qualification of the goods and items purchased is determined subsequently. Other suitable processes can be used. The method then proceeds to 710.

At 710 payment data is transmitted. In one exemplary embodiment, the payment data can include payment data transmitted to payment processing system 114. In another exemplary embodiment, the payment can include payment data or a subset of the payment data transmitted to payment processing system 114 that is also transmitted to account management system 102. Other suitable payment data can be transmitted.

In operation, method 700 allows purchase data to be processed to determine whether it is authorized for an expense reimbursement program. Method 700 allows business expense reimbursement programs, medical expense reimbursement programs, or other suitable programs to be used where identification qualifying expenses for the program is made based upon a pre-approved list of goods and services, pre-approved sources, pre-approved expense limits, or other suitable data. Method 700 thus allows users to provide a form of payment, such as a credit card that has been enrolled in a program, and allows the goods and services purchased with a credit card to be screened to determine whether they are qualified for reimbursement in the program. This screening can occur locally at the point of sale, can occur at a centralized account management system 102, or in other suitable processes.

Figure 8:
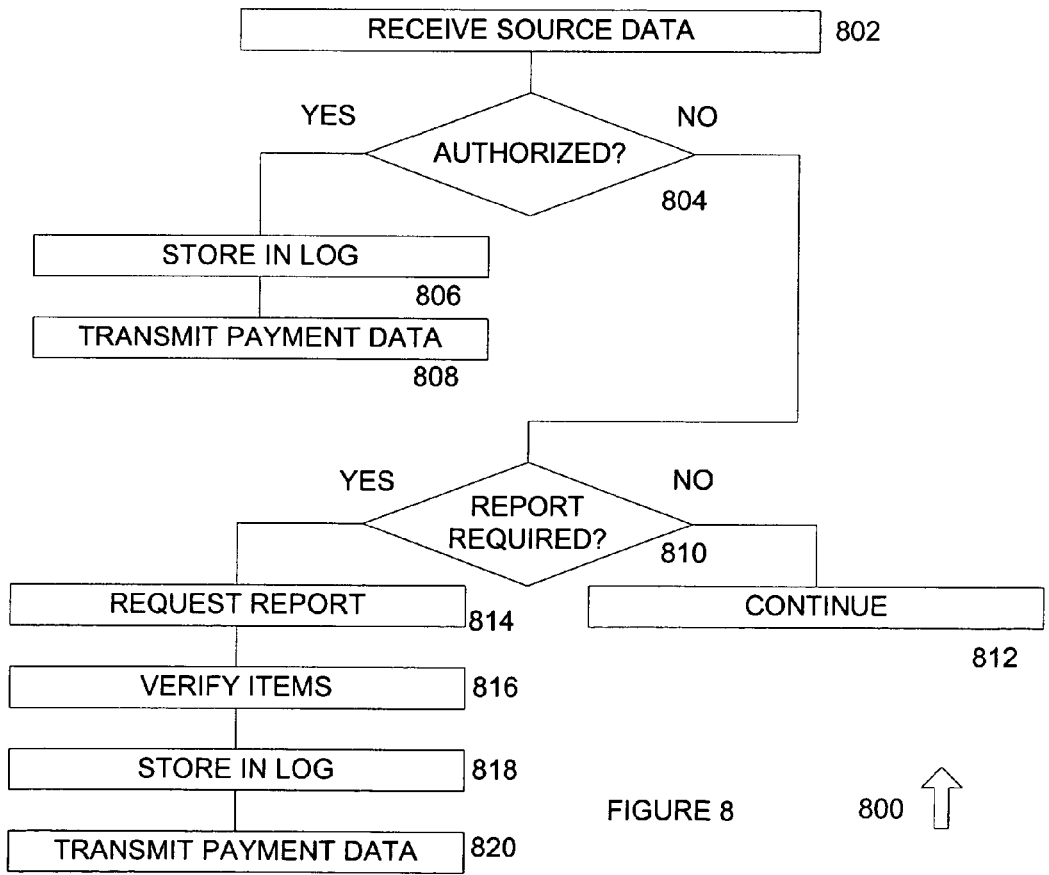
FIG. 8 is a flow chart of a method for processing source data in accordance with an exemplary embodiment of the present invention.

FIG. 8 is a flow chart of a method 800 for processing source data in accordance with an exemplary embodiment of the present invention.

Method 800 begins at 802 where source data is received. In one exemplary embodiment, the source data can be received at the payment processing system 114, at account management system 102, or in other suitable manners. The method then proceeds to 804. At 804, it is determined whether the source is authorized. In one exemplary embodiment, source authorization can be determined based on a point of sale identifier, a credit card number, other payment data, other source data, where the source data and the payment identification data are compared to determine whether there is a match, or other suitable data. In this exemplary embodiment, payment processing system 114, account management system 102, or other suitable systems can have a list of authorized participants in a program and authorized sources in a program, and can determine whether there is a match between the participant data and source data for each transaction that is received from a participant, from a source, or in other suitable manners.

If it is determined that 804 that the transaction is not authorized the method proceeds to 810. Otherwise the method proceeds to 806 where the source data and associated transaction data are stored in a log. In this exemplary embodiment, the log can be stored at account management system 102, payment processing system 114, or at other suitable locations. The method then proceeds to 808 where payment data is transmitted. In one exemplary embodiment, the payment data is transmitted to a check generation system, electronic fund transfer system, or other suitable systems, such as where payment is made based on a purchase being made at a qualified source by a program participant. The program participant's account can also be debited, the debit can be performed prior to transmission of payment data, such as where no payment data is transmitted after an account balance has been exhausted, or other suitable processes can be used.

At 810, it is determined whether a report is required. In one exemplary embodiment, the report can be a report requested by account management system 102 from a qualified vendor system 104, a report to a government agency, a report to a user, or other suitable reports. If no report is required the method proceeds to 812 and the process continues. Otherwise, the method proceeds to 814 where a report can be requested. In one exemplary embodiment, where the report is requested by account management system 102 from a qualified vendor system 104, such as when account management system 102 receives a transaction indicator from payment processing system 114 but requires additional item data to determine whether specific goods and services are qualified, the report can be requested from account management system 102 to qualified vendor system 104. The method then proceeds to 816.

At 816, items are verified on the report. In one exemplary embodiment, the items can be verified based on identification codes, based on descriptions of goods and services, or in other suitable manners. The method then proceeds to 818. At 818, qualified items are stored in the log. In this exemplary embodiment, the log can be stored to satisfy audit availability requirements from government agencies, to track payments made based on purchases, or in other suitable manners. The method then proceeds to 820.

At 820 payment data is transmitted, such as after an account balance has been verified, an account balance has been debited, by generation of a check, by electronic funds transfer, or in other suitable manners.

In operation, method 800 performs payment processing based on source data. Method 800 can be used to identify sources where goods and services may be qualified, for subsequent verification of specific goods and services. In another exemplary embodiment, method 800 can be used to automatically generate payments based on sources, such as where sources are pre-qualified for program participants.

FIG. 9 is a flow chart of a method 900 for registering a credit card number or social security number and using the registered number to process expense reimbursement in accordance with an exemplary embodiment of the present invention.

Method 900 begins at 902, where an identification number is received. In one exemplary embodiment, the identification number can be a credit card number, a social security number, a frequent flyer number, a driver's license number, or other suitable data. The method then proceeds to 904 where it is determined whether the number is to be registered. If the number is to be registered, such as when a user is being prompted to enter identification numbers for registration in an expense reimbursement program, the method proceeds to 906 where the identification numbers are stored in a suitable log file, filter list, or other suitable locations. In one exemplary embodiment, the identification numbers can be used to filter a list of credit card transaction data, pharmacy switch transaction data, or other suitable data, such as by querying the list with each number, performing a database compare, or in other suitable manners. The identification data stored at 906 can be stored as needed to support such processes.

If it is determined at 904 that the identification number does not need to be registered, such as where the identification number has been received to locate transaction data, the method proceeds to 908 where transaction records are searched using the identification number. As discussed, a list search, filter process, database match, or other suitable processes can be used to extract transaction records associated with the identification number from a database, a data stream, or in other suitable manners. The method then proceeds to 910.

At 910, matching transactions are retrieved. The transactions can be retrieved based on a matching credit card number, a matching social security number, or other matching numbers. The method then proceeds to 912 where the transactions are filtered, such as to exclude transactions from locations that are not approved locations for qualifying transactions, to locate transactions from approved locations, or in other suitable manners. Filtering can also be performed prior to retrieving matching transactions.

For example, credit card transaction data can be received and a database match can be performed between a list of credit card numbers for participants in a medical flexible spending account program, and the resulting list can then be filtered to exclude records that do not have a suitable identifier that identifies the transaction as being involved with a doctor's office, a pharmacy, a hospital, or other suitable facilities. Likewise, the credit card transaction data can first be filtered using a list of locations/terminal identifiers that are associated with qualified facilities such as hospitals, doctor's offices, pharmacies, etc. and the resulting list can then be searched serially, using a database match, or in other suitable manners using a list of registered credit card numbers. A similar process can be used with social security numbers or other suitable identification data and pharmacy switch transactions, such as where a pharmacist submits a prescription, a social security number, and other suitable transaction data to an insurance company for approval of the amount that the pharmacist intends to charge for the prescription drugs, for copay information, for deductible information, and for other information. The response data from the insurance company can then be filtered to exclude declined transactions and then matched against registered social security numbers, the response data can be matched against registered social security numbers and can then be filtered to extract co-pay amounts and deductible amounts, or other suitable processes can be used. The method then proceeds to 914.

At 914, payment data is transmitted for reimbursement under the expense plan rules. In one exemplary embodiment, the payment can be extracted from an account and provided directly to the service provider. In another exemplary embodiment, a check can be generated, an amount can be credited to a participant's checking account, or other suitable processes can be used to process the transmitted payment data.

Having thus described exemplary embodiments of the invention, it will be apparent that further alterations, modifications, and improvements will also occur to those skilled in the art. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

What is claimed is:

1. A method for processing a transaction by a data processing system, the data processing system comprising at least one processor and one or more memories, the method comprising:
   receiving, by the data processing system via a network, transaction data comprising a first amount to be paid by an insurance company and a second amount that was paid by an insured party;
   determining, by the data processing system, whether the second amount is eligible to be reimbursed from a first account associated with the insured party, wherein funds in the first account are not directly accessible to the insured party;
   determining, by the data processing system, whether sufficient funds are available in the first account to reimburse the second amount;
   deducting, by the data processing system, the second amount from the first account associated with the insured party in response to determining that the second amount is eligible to be reimbursed from the first account and that there are sufficient funds available in the first account to reimburse the second amount; and
   transferring, by the data processing system, the second amount over an electronic financial network to a second account associated with the insured party, wherein funds in the second account are directly accessible by the insured party.

2. The method of claim 1 wherein receiving the transaction data comprises receiving the transaction data from a qualified vendor system.

3. The method of claim 2 wherein the qualified vendor system is part of a point of sale system.

4. The method of claim 1 wherein the electronic financial network is a credit card network.

5. The method of claim 1 wherein the electronic financial network is a bank network.

6. The method of claim 1 wherein the second amount is an insurance co-pay amount.

7. The method of claim 1 further comprising:
   determining the second amount that was paid by the insured party, wherein determining the second amount comprises:
      receiving an identification of the insured party and a description of goods or services; and
      accessing, based on the identification of the insured party and the description of goods or services, electronic data records stored in a database, the electronic data records comprising the second amount.

8. The method of claim 1 further comprising:
   generating an itemized list of reimbursed amounts on receipt of a demand that is electronically generated by a user.

9. The method of claim 1, wherein the data processing system comprises at least one hardware system.

10. A method for processing a transaction comprising:
receiving transaction data addressed to a first server system from a qualified vendor system, the transaction data comprising a first data field that defines a first amount to be paid by an insurance company and a second data field that defines a second amount that was paid by an insured party;
determining, by a second server system, whether the second amount is eligible to be reimbursed from a first account associated with the insured party;
determining, by a third server system, whether sufficient funds are available in the first account to reimburse the second amount; and
deducting the second amount from the first account associated with the insured party in response to determining that the second amount is eligible to be reimbursed from the first account and that there are sufficient funds available in the first account to reimburse the second amount; and
transferring the second amount over a credit card network to a second account associated with the insured party, wherein funds in the second account are directly accessible by the insured party;
wherein each of the first server system, the second server system, and the third server system comprises at least one processor and one or more memories.

11. The method of claim 10 wherein the second amount is an insurance co-pay amount.

12. The method of claim 10 further comprising:
determining the second amount that was paid by the insured party, wherein determining the second amount comprises:
receiving an identification of the insured party and a description of goods or services; and
accessing, based on the identification of the insured party and the description of goods or services, electronic data records stored in a database, the electronic data records comprising the second amount.

13. The method of claim 10 wherein the qualified vendor system is part of a point of sale system.

14. The method of claim 10 further comprising:
generating an itemized list of reimbursed amounts on receipt of a demand that is electronically generated by a user.

15. The method of claim 10, wherein at least one of the first, second, and third server systems comprise at least one hardware system.

16. A method for processing a transaction comprising:
receiving transaction data addressed to a first server system from a qualified vendor system, the transaction data comprising a first data field that defines a first amount to be paid by an insurance company and a second data field that defines a second amount that was paid by an insured party;
determining, by a second server system, whether the second amount is eligible to be reimbursed from a first account associated with the insured party;
determining, by a third server system, whether sufficient funds are available in the first account to reimburse the second amount;
deducting, by a fourth server system, the second amount from the first account associated with the insured party in response to determining that the second amount is eligible to be reimbursed from the first account and that there are sufficient funds available in the first account to reimburse the second amount; and
transferring the second amount over a banking network to a second account associated with the insured party, wherein funds in the second account are directly accessible by the insured party;
wherein each of the first server system, the second server system, the third server system, and the fourth server system comprises at least one processor and one or more memories.

17. The method of claim 16 wherein the second amount is an insurance co-pay amount.

18. The method of claim 17 wherein the qualified vendor system is part of a point of sale system.

19. The method of claim 17 further comprising:
generating an itemized list of reimbursed amounts upon receipt of a demand that is electronically generated by a user.

20. The method of claim 17 further comprising:
receiving a request to generate a report;
retrieving data for the report from an electronic data memory structure; and
generating the report.

21. The method of claim 20 wherein retrieving data for the report from the electronic data memory structure comprises retrieving an identification of qualified services.

22. The method of claim 16 further comprising:
determining the second amount that was paid by the insured party, wherein determining the second amount comprises:
receiving an identification of the insured party and a description of goods or services; and
accessing, based on the identification of the insured party and the description of goods or services, electronic data records stored in a database, the electronic data records comprising the second amount.

23. The method of claim 16, wherein at least one of the first, second, third, and fourth server systems comprise at least one hardware system.

24. A non-transitory computer readable medium having instructions embodied thereon for processing a transaction, the instructions comprising:
instructions to receive transaction data, the transaction data comprising a first amount to be paid by an insurance company and a second amount that was paid by an insured party;
instructions to determine, by a data processing system, whether the second amount is eligible to be reimbursed from a first account associated with the insured party, wherein funds in the first account are not directly accessible to the insured party;
instructions to determine, by the data processing system, whether sufficient funds are available in the first account to reimburse the second amount;
instructions to deduct the second amount from the first account associated with the insured party in response to determining that the second amount is eligible to be reimbursed from the first account and that there are sufficient funds available in the first account to reimburse the second amount; and
instructions to transfer the second amount over an electronic financial network to a second account associated with the insured party, wherein funds in the second account are directly accessible by the insured party.

25. The computer readable medium of claim 24 wherein the second amount is an insurance co-pay amount.

26. The computer readable medium of claim 24 wherein the instructions further comprise:
  instructions to determine the second amount that was paid by the insured party, wherein the instructions to determine the second amount comprise:
    instructions to receive an identification of the insured party and a description of goods or services; and
    instructions to access, based on the identification of the insured party and the description of goods or services, electronic data records stored in a database, the electronic data records comprising the second amount.

27. The computer readable medium of claim 24 wherein the instructions further comprise:
  instructions to generate an itemized list of reimbursed amounts on receipt of a demand that is electronically generated by a user.

28. A computing system for processing a transaction, the computing system comprising:
  at least one processor;
  a communication mechanism; and
  one or more memories in communication with the processor, the one or more memories having embodied thereon instructions, the instructions comprising:
    instructions to receive, via the communication mechanism, transaction data comprising a first amount to be paid by an insurance company and a second amount that was paid by an insured party;
    instructions to determine, by a data processing system, whether the second amount is eligible to be reimbursed from a first account associated with the insured party, wherein funds in the first account are not directly accessible to the insured party;
    instructions to determine, by the data processing system, whether sufficient funds are available in the first account to reimburse the second amount;
    instructions to deduct the second amount from the first account associated with the insured party in response to determining that the second amount is eligible to be reimbursed from the first account and that there are sufficient funds available in the first account to reimburse the second amount; and
    instructions to transfer the second amount over an electronic financial network to a second account associated with the insured party, wherein funds in the second account are directly accessible by the insured party.

29. The computing system of claim 28 wherein the second amount is an insurance co-pay amount.

30. The computing system of claim 28 wherein the instructions further comprise:
  instructions to determine the second amount that was paid by the insured party, wherein the instructions to determine the second amount comprise:
    instructions to receive an identification of the insured party and a description of goods or services; and
    instructions to access, based on the identification of the insured party and the description of goods or services, electronic data records stored in a database, the electronic data records comprising the second amount.

31. The computing system of claim 28 wherein the instructions further comprise:
  instructions to generate an itemized list of reimbursed amounts on receipt of a demand that is electronically generated by a user.

32. A non-transitory computer readable medium having instructions embodied thereon for processing a transaction, the instructions comprising:
  instructions to receive transaction data comprising a first data field that defines a first amount to be paid by an insurance company and a second data field that defines a second amount that was paid by an insured party;
  instructions to determine, by a second server system, whether the second amount is eligible to be reimbursed from a first account associated with the insured party;
  instructions to determine, by a third server system, whether sufficient funds are available in the first account to reimburse the second amount; and
  instructions to deduct the second amount from the first account associated with the insured party in response to determining that the second amount is eligible to be reimbursed from the first account and that there are sufficient funds available in the first account to reimburse the second amount; and
  instructions to transfer the second amount over a credit card network to a second account associated with the insured party, wherein funds in the second account are directly accessible by the insured party.

33. The computer readable medium of claim 32 wherein the second amount is an insurance co-pay amount.

34. The computer readable medium of claim 32 wherein the instructions further comprise:
  instructions to determine the second amount that was paid by the insured party, wherein the instructions to determine the second amount comprise:
    instructions to receive an identification of the insured party and a description of goods or services; and
    instructions to access, based on the identification of the insured party and the description of goods or services, electronic data records stored in a database, the electronic data records comprising the second amount.

35. The computer readable medium of claim 32 wherein the instructions further comprise:
  instructions to generate an itemized list of reimbursed amounts on receipt of a demand that is electronically generated by a user.

36. A computing system for processing a transaction, the computing system comprising:
  at least one processor;
  a communication mechanism; and
  one or more memories in communication with the processor, the one or more memories having instructions embodied thereon, the instructions comprising:
    instructions to receive, via the communication mechanism, transaction data comprising a first data field that defines a first amount to be paid by an insurance company and a second data field that defines a second amount that was paid by an insured party;
    instructions to determine, by a second server system, whether the second amount is eligible to be reimbursed from a first account associated with the insured party;
    instructions to determine, by a third server system, whether sufficient funds are available in the first account to reimburse the second amount; and
    instructions to deduct the second amount from the first account associated with the insured party in response to determining that the second amount is eligible to be reimbursed from the first account and that there are sufficient funds available in the first account to reimburse the second amount; and
    instructions to transfer the second amount over a credit card network to a second account associated with the insured party, wherein funds in the second account are directly accessible by the insured party.

37. The computing system of claim 36 wherein the second amount is an insurance co-pay amount.

38. The computing system of claim 36 wherein the instructions further comprise:
instructions to determine the second amount that was paid by the insured party, wherein the instructions to determine the second amount comprise:
instructions to receive an identification of the insured party and a description of goods or services; and
instructions to access, based on the identification of the insured party and the description of goods or services, electronic data records stored in a database, the electronic data records comprising the second amount.

39. The computing system of claim 36 wherein the instructions further comprise:
instructions to generate an itemized list of reimbursed amounts on receipt of a demand that is electronically generated by a user.

40. A non-transitory computer readable medium having instructions embodied thereon for processing a transaction, the instructions comprising:
instructions to receive transaction data comprising a first data field that defines a first amount to be paid by an insurance company and a second data field that defines a second amount that was paid by an insured party;
instructions to determine whether the second amount is eligible to be reimbursed from a first account associated with the insured party;
instructions to determine whether sufficient funds are available in the first account to reimburse the second amount;
instructions to deduct the second amount from the first account associated with the insured party in response to determining that the second amount is eligible to be reimbursed from the first account and that there are sufficient funds available in the first account to reimburse the second amount; and
instructions to transfer the second amount over a banking network to a second account associated with the insured party, wherein funds in the second account are directly accessible by the insured party.

41. The computer readable medium of claim 40 wherein the second amount is an insurance co-pay amount.

42. The computer readable medium of claim 40 wherein the instructions further comprise:
instructions to determine the second amount that was paid by the insured party, wherein the instructions to determine the second amount comprise:
instructions to receive an identification of the insured party and a description of goods or services; and
instructions to access, based on the identification of the insured party and the description of goods or services, electronic data records stored in a database, the electronic data records comprising the second amount.

43. The computer readable medium of claim 40 wherein the instructions further comprise:
instructions to generate an itemized list of reimbursed amounts upon receipt of a demand that is electronically generated by a user.

44. A computing system for processing a transaction, the computing system comprising:
at least one processor;
a communication mechanism; and
one or more memories in communication with the processor, the one or more memories having instructions embodied thereon, the instructions comprising:
instructions to receive, via the communication mechanism, transaction data comprising a first data field that defines a first amount to be paid by an insurance company and a second data field that defines a second amount that was paid by an insured party;
instructions to determine whether the second amount is eligible to be reimbursed from a first account associated with the insured party;
instructions to determine whether sufficient funds are available in the first account to reimburse the second amount;
instructions to deduct the second amount from the first account in response to determining that the second amount is eligible to be reimbursed from the first account associated with the insured party and that there are sufficient funds available in the first account to reimburse the second amount; and
instructions to transfer the second amount over a banking network to a second account associated with the insured party, wherein funds in the second account are directly accessible by the insured party.

45. The computing system of claim 44 wherein the second amount is an insurance co-pay amount.

46. The computing system of claim 44 wherein the instructions further comprise:
instructions to determine the second amount that was paid by the insured party, wherein the instructions to determine the second amount comprise:
instructions to receive an identification of the insured party and a description of goods or services; and
instructions to access, based on the identification of the insured party and the description of goods or services, electronic data records stored in a database, the electronic data records comprising the second amount.

47. The computing system of claim 44 wherein the instructions further comprise:
instructions to generate an itemized list of reimbursed amounts upon receipt of a demand that is electronically generated by a user.

* * * * *